United States Patent
Chaudhuri et al.

(10) Patent No.: US 7,296,011 B2
(45) Date of Patent: Nov. 13, 2007

(54) EFFICIENT FUZZY MATCH FOR EVALUATING DATA RECORDS

(75) Inventors: Surajit Chaudhuri, Redmond, WA (US); Kris Ganjam, Seattle, WA (US); Venkatesh Ganti, Redmond, WA (US); Rajeev Motwani, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 10/600,083

(22) Filed: Jun. 20, 2003

(65) Prior Publication Data

US 2004/0260694 A1 Dec. 23, 2004

(51) Int. Cl.
*G06F 7/00* (2006.01)
*G06F 17/30* (2006.01)

(52) U.S. Cl. .......................................... 707/3
(58) Field of Classification Search ............... 707/5, 707/6, 204, 3, 1, 4; 395/611
See application file for complete search history.

(56) References Cited

U.S. PATENT DOCUMENTS

| | | | | |
|---|---|---|---|---|
| 5,577,249 | A * | 11/1996 | Califano ................ | 707/100 |
| 6,556,987 | B1 * | 4/2003 | Brown et al. ............. | 707/3 |
| 6,636,850 | B2 * | 10/2003 | Lepien .................... | 707/6 |
| 6,961,721 | B2 * | 11/2005 | Chaudhuri et al. ....... | 707/1 |
| 7,051,277 | B2 * | 5/2006 | Kephart et al. .......... | 715/530 |
| 2002/0124015 | A1* | 9/2002 | Cardno et al. ........... | 707/204 |
| 2004/0249789 | A1* | 12/2004 | Kapoor et al. ........... | 707/2 |

OTHER PUBLICATIONS

Rahm et al., "Data Cleaning: Problems and Current Approaches", IEEE Bulletin of the Technical Committee on Data Engineering, vol. 23, No. 4, Dec. 2000.*

Hernandez et al., "Real-world Data is Dirty: Data Cleaning and The Merge/Purge Problem", Journal of Data Mining and Knowledge Discovery 2(1):9-37; 1998.*

Ananthakrishna et al., "Eliminating Duplicates in Data Warehouses", Proceedings of the 28th International Conference on Very Large Databases (VLDB) 2002, Hong Kong.*

R. Ananthakrishna, S. Chaudhuri and V. Ganti. Eliminating Fuzzy Duplicates in Data Warehouses. In *Proceedings of VLDB*, Hong Kong, 2002.

A.N: Arslan, O. Egecioglu and P.A. Pevzner. A New Approach to Sequence Comparison: Normalized Local Alignment. *Bioinformatics*. 17(4):327-337, 2001.

J.A. Aslam, K, Pelekhov and D. Rus. Static and Dynamic Information Organization with Star Clusters. *CIKM* 1998, pp. 208-217.

J.A. Aslam, K, Pelekhov and D. Rus. A Practical Clustering Algorithm for Static and Dynamic Information Organization. *ACM-SIAM Symposium on Discrete Algorithms*, 1999.

(Continued)

*Primary Examiner*—Jeffrey Gaffin
*Assistant Examiner*—Michael J Hicks

(57) ABSTRACT

To help ensure high data quality, data warehouses validate and clean, if needed incoming data tuples from external sources. In many situations, input tuples or portions of input tuples must match acceptable tuples in a reference table. For example, product name and description fields in a sales record from a distributor must match the pre-recorded name and description fields in a product reference relation. A disclosed system implements an efficient and accurate approximate or fuzzy match operation that can effectively clean an incoming tuple if it fails to match exactly with any of the multiple tuples in the reference relation. A disclosed similarity function that utilizes token substrings referred to as q-grams overcomes limitations of prior art similarity functions while efficiently performing a fuzzy match process.

42 Claims, 4 Drawing Sheets

OTHER PUBLICATIONS

V. Borkar, K Deshmukh and S. Sarawagi. Automatic Segmentation of Text Into Structured Records. In *Proceedings of ACM SIGMOD Conference*, Santa Barbara, CA, May 2001.

A. Broder, S. Glassman, M. Manasse and G. Zweig. Syntatctic Clustering of the Web. In *Proc. Sixth Int'l. World Wide Web Conference, World Wide Web Consortium*, Cambridge, pp. 391-404, 1997.

K. Beyer, J. Goldstein, R. Ramakrishnan and U. Shaft. When is "Nearest Neighbor" Meaningful? *International Conference on Database Theory*, pp. 217-235. Jan. 1999.

S. Chaudhuri, K. Ganjam, V. Ganti and R. Motwani. Robust and Efficient Fuzzy Match for Online Data Cleaning. In *Proceedings of ACM SIGMOD*, San Diego, CA Jun. 2003.

W. Cohen. Integration of Heterogenous Databases Without Common Domains Using Queries Based on Textual Similarity. In *Proceedings of ACM SIGMOD*, pp. 201-212, Seattle, WA Jun. 1998.

R. Forino. *Data e.quality: A behind the Scenes Perspective on Data Cleansing*. http://www.dmreview.com/, Mar. 2001.

H. Galhardas, D. Florescu, D. Shasha, E. Simon and C. Saita. Declarative Data Cleaning: Language, Model, and Algorithms. In *Proceedings of the 27th International Conference on Very Large Databases*, pp. 371-380, Roma, Italy, Sep. 11-14, 2001.

H. Galhardas, D. Florescu, D. Shasha and E. Simon. An Extensible Framework for Data Cleaning. In *ACM SIGMOD*, May 1999.

L. Gravano, P. Ipeirotis, H.V. Jagadish, N. Kousas, S. Muthukrishnan and D. Srivastava. Approximate String Joins in a Database (Almost) For Free. In *Proceedings of the VLDB* 2001.

V. Ganti, J. Gehrke and R. Ramakrishnan. Cactus-Clustering Categorical Data Using Summaries. In *Proceedings of the ACM SIGKDD Fifth International Conference on Knowledge Discovery in Databases*, pp. 78-83, Aug. 15-18, 1999.

D. Gibson, J. Kleinberg and P. Raghavan. Clustering Categorical Data: An Approach Based on Dynamical Systems, *VLDB* 1998, New York City, New York, Aug. 24-27.

S. Guha, R. Rastogi and K. Shim. Rock: A Robust Clustering Algorithm for Categorical Attributes. In *Proceedings of the IEEE International Conference on Data Engineering*, Sydney, Mar. 1999.

Y. Huhtala, J. Karkkainen, P. Porkka and H. Toivonen. Efficient Discovery of Functional and Approximate Dependencies Using Partitions. In *Proceedings of the 14th International Conference on Data Engineering (ICDE)*, pp. 392-401, Orlando, Florida, Feb. 1998.

M. Hernandez and S. Stolfo. The Merge/Purge Problem for Large Databases. In *Proceedings of the ACM SIGMOD*, pp. 127-138, San Jose, CA May 1995.

J. Madhavan, P. Bernstein, E. Rahm. Generic Schema Matching with Cupid. *VLDB* 2001, pp. 49-58, Roma, Italy.

A. Monge and C. Elkan. The Field Matching Problem: Algorithms and Applications. In *Proceedings of the Second Interntational Conference on Knowledge Discovery and Databass (KDD)*, 1996.

A. Monge and C. Elkan. An Efficient Domain-Independent Algorithm for Detecting Approximately Duplicate Database Records. In *Proceedings of the SIGMOD Workshop on Data Mining and Knowledge Discovery*, Tucson, Arizona, May 1997.

F. Naumann and C. Rolker. Do Metadata Models Meet IQ Requirements? In *Proceedings of the International Conference on Data Quality (IQ), MIT*, Cambridge, 1999.

E. Rahm and H. Hai Do. Data Cleaning: Problems and Current Approaches. *IEEE Data Engineering Bulletin*, 23(4):3-13, Dec. 2000.

V. Raman and J. Hellerstein. Potter's Wheel: An Interactive Data Cleaning System. *VLDB 2001*, pp. 381-390, Roma, Italy.

S. Sarawagi and A. Bhamidipaty. Interactive Deduplication Using Active Learning. In *Proceedings of the Eighth ACM SIGKDD International Conference on Knowledge Disocvery in Databases*, Edmonton, Canada, Jul. 23-26, 2002.

* cited by examiner

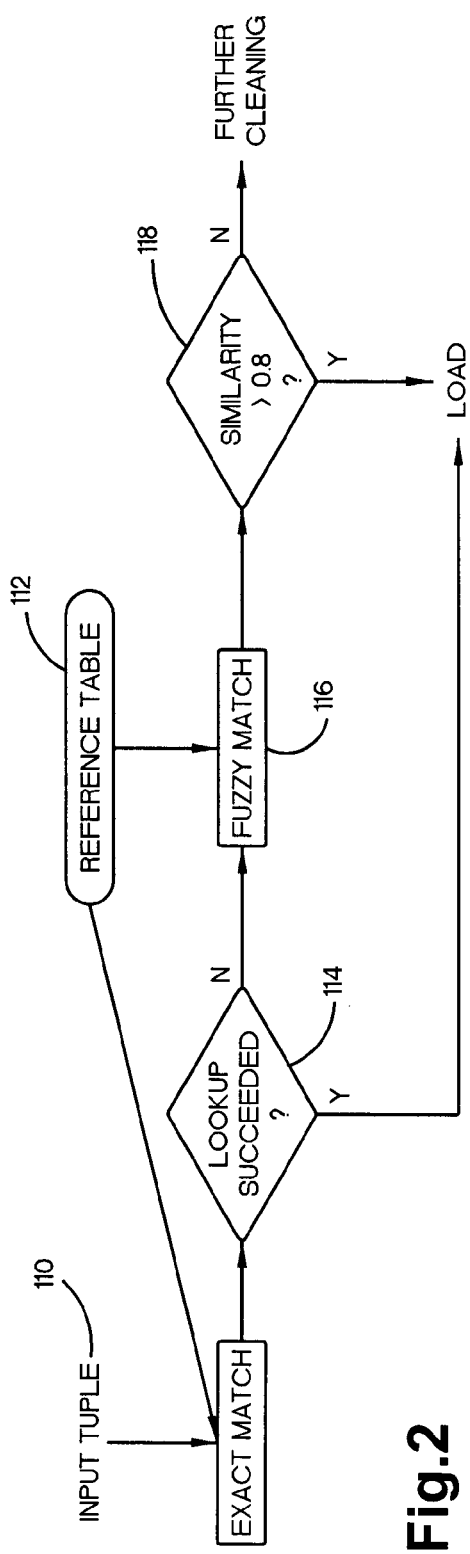
Fig.2
Fig.3
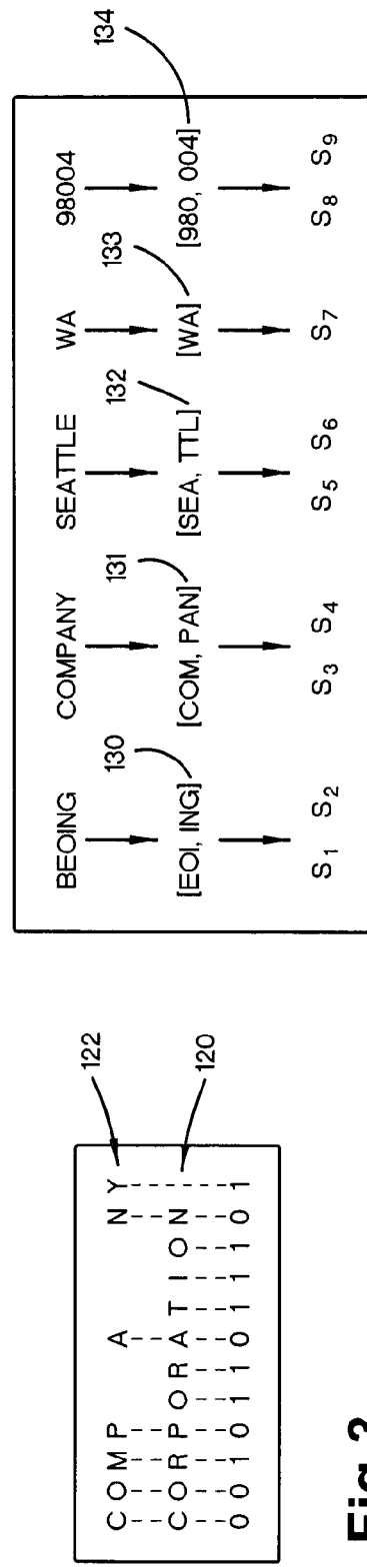
Fig.4

EFFICIENT FUZZY MATCH FOR EVALUATING DATA RECORDS

FIELD OF THE INVENTION

The present invention concerns a system for evaluating input data records based on the contents of a reference table to determine a closeness of the input record and entries in the reference table.

BACKGROUND ART

Decision support analysis on data warehouses influences important business decisions; therefore, accuracy of such analysis is important. However, data received at the data warehouse from external sources usually contains errors, e.g., spelling mistakes, inconsistent conventions across data sources, missing fields. Consequently, a significant amount of time and money are spent on data cleaning, the task of detecting and correcting errors in data. A prudent alternative to the expensive periodic data cleaning of an entire data warehouse is to avoid the introduction of errors during the process of adding new data into the warehouse. This approach requires input tuples to be validated and corrected before they are added to the database.

A known technique validates incoming tuples against reference relations consisting of known-to-be-clean tuples in the database. The reference relations may be internal to the data warehouse (e.g., customer or product relations) or obtained from external sources (e.g., valid address relations from postal departments). An enterprise maintaining a relation consisting of all its products may ascertain whether or not a sales record from a distributor describes a valid product by matching the product attributes (e.g., Part Number and Description) of the sales record with the Product relation; here, the Product relation is the reference relation. If the product attributes in the sales record match exactly with a tuple in the Product relation, then the described product is likely to be valid. However, due to errors in sales records, often the input product tuple does not match exactly with any in the Product relation. Then, errors in the input product tuple need to be corrected before it is stored. The information in the input tuple is still very useful for identifying the correct reference product tuple, provided the matching is resilient to errors in the input tuple. Error-resilient matching of input tuples against the reference table is referred to as a fuzzy match operation.

Suppose an enterprise wishes to ascertain whether or not the sales record describes an existing customer by fuzzily matching the customer attributes of the sales record against the Customer relation. The reference relation, Customer, contains tuples describing all current customers. If the fuzzy match returns a target customer tuple that is either exactly equal or "reasonably close" to the input customer tuple, then the input tuple would have been validated or corrected. A notion of closeness between tuples is usually measured by a similarity function. If the similarity between an input customer tuple and its closest reference tuple is higher than some threshold, then the correct reference tuple is loaded. Otherwise, the input is routed for further cleaning before considering it as referring to a new customer. A fuzzy match operation that is resilient to input errors can effectively prevent the proliferation of fuzzy duplicates in a relation, i.e., multiple tuples describing the same real world entity. See Hernandez et al "The merge/purge problem for large databases" in Proceedings of the ACM SIGMOD, San Jose, Calif. May 1995.

Several methods for approximate string matching over dictionaries or collections of text documents have been proposed (e.g., Gravano et al "Approximate string joins in a database (almost) for Free". In Proceedings of VLDB, Roma, Italy, Sep. 11-14, 2001 and Navarro et al "Indexing methods for approximate string matching." In IEEE Data Engineering Bulletin, 24(4):19-27,2001.). All of the above methods use edit distance as the similarity function, not considering the crucial aspect of differences in importance of tokens while measuring similarity.

Approximate string matching methods [e.g., R. Baeza-Yates and G. Navarro. A practical index for text retrieval allowing errors. In R. Monge, editor, *Proceedings of the XXIII Latin American Conference on Informatics (CLEI'97)*, Valparaiso, Chile, 1997. and G. Navarro, E. Sutinen, J. Tanninen, and J. Tarhio. Indexing text with approximate q-grams. In *Proceedings of the 11th Annual Symposium on Combinatorial Pattern Matching (CPM'2000)*, LNCS 1848, 2000.] preprocess the set of dictionary/text strings to build q-gram tables containing tuples for every string s of length q that occurs as a substring of some reference text string; the record also consists of the list of identifiers (or locations) of strings of which s is a substring. The error tolerant index relation ETI we build from the reference relation is similar in that we also store q-grams along with the list of record identifiers in which they appear, but the ETI (i) is smaller than a full q-gram table because we only select (probabilistically) a subset of all q-grams per tuple, and (ii) encodes column-boundaries specific to relational domains.

The information retrieval community has successfully exploited inverse document frequency (IDF) weights for differentiating the importance of tokens or words. However, the IR application assumes that all input tokens in the query are correct, and does not deal with errors therein. Only recently, some search engines (e.g., Google's "Did you mean?" feature) are beginning to consider even simple spelling errors. In the fuzzy match operation, we deal with tuples containing very few tokens (many times, around 10 or less) and hence cannot afford to ignore erroneous input tokens, as they could be crucial for differentiating amongst many thousands of reference tuples. For example, the erroneous token 'beoing' in the input tuple [beoing corporation, Seattle, Wash., NULL] is perhaps the most useful token for identifying the target from among all corporation records of companys in the Seattle area. Clustering and reference matching algorithms [e.g., W. Cohen. Integration of heterogeneous databases without common domains using queries based on textual similarity. In *Proceedings of ACM SIGMOD*, Seattle, Wash., June 1998. W. Cohen. Data integration using similarity joins and a word-based information representation language. *ACM Transactions on Information Systems*, 18(3):288-321, July 2000.E. Cohen and D. Lewis. Approximating matrix multiplication for pattern recognition tasks. In *SODA: ACM-SIAM Symposium on Discrete Algorithms*, 1997.] using the cosine similarity metric with IDF weighting also share the limitation of ignoring erroneous input tokens. Further, efficiency is improved by choosing probabilistically a subset of tokens from each document under the correct input token assumption.

As discussed earlier, almost all solutions for the nearest neighbor problem are targeted at data in Euclidean/normed spaces and hence are inapplicable to the present invention. See V. Gaede and O. Gunther. "Multidimensional access methods." *ACM Computing Surveys*, 30(2):170-231, 1998. There has been some recent work on general metric spaces [e.g., P. Ciaccia, M. Patella, P. Zezula. M-tree: An efficient access method for similarity search in metric spaces. VLDB 1997. G. Navarro. Searching in metric spaces by spatial approximation. *The VLDB Journal*, 11(1):28-46, 2002. Their complexity and performance are not suitable for the high-throughput systems of interest here. Moreover, many of these solutions cannot be deployed easily over current data warehouses because they require specialized index structures (e.g., M-trees, tries) to be persisted.

Some recent techniques address a related problem of eliminating "fuzzy duplicates" in a relation by using a similarity function by identifying highly similar tuples as duplicates. Some are based on the use of edit distance [e.g., M. Hernandez and S. Stolfo. The merge/purge problem for large databases. In *Proceedings of the ACM SIGMOD*, San Jose, Calif., May 1995.] and some on cosine similarity with IDF weights [e.g., W. Cohen. Data integration using similarity joins and a word-based information representation language. *ACM Transactions on Information Systems*, 18(3): 288-321, July 2000. ]. Such techniques are designed for use in an offline setting and do not satisfy the efficiency requirements of an online fuzzy match operation where input tuples have to be quickly matched with target reference tuples before being loaded into the data warehouse. A complementary need is to first clean a relation by eliminating fuzzy duplicates and then piping further additions through the fuzzy match operation to prevent introduction of new fuzzy duplicates.

SUMMARY OF THE INVENTION

An exemplary system provides a robust and efficient fuzzy match process that is applicable across a wide variety of domains. The system provides a strong foundation for adding domain-specific enhancements. Most data warehouses are built atop database systems. Consequently, in addition to robustness and efficiency the disclosed fuzzy match solution is implemented over standard database systems without requiring the persistence of complex data structures.

An important ingredient of the fuzzy match operation is the similarity function used for comparing tuples. In typical application domains, the similarity function must definitely handle string-valued attributes and possibly even numeric attributes. For string-valued attributes, defining similarity and performing fuzzy matching is challenging. Given the similarity function and an input tuple, one goal of the fuzzy match operation is to return the reference tuple—a tuple in the reference relation—which is closest to the input tuple. An alternative return the closest K reference tuples enabling users to choose one among them as the target, rather than the closest. An additional alternative is to output K or fewer tuples whose similarity to the input tuple exceeds a user-specified minimum similarity threshold. This formulation is similar to a nearest neighbor problem, but in prior art nearest neighbor analyses the domain is typically a Euclidean (or other normed) space with well-behaved similarity functions. In the present system, the data are not represented in "geometric" spaces, and it is hard to map them into such spaces because the similarity function is relatively complex.

The system uses a novel fuzzy match similarity function that explicitly considers IDF token weights and input errors while comparing tuples. One implementation uses an error tolerant index and a probabilistic process for efficiently retrieving the K reference tuples closest to the input tuple, according to a fuzzy match similarity function. The exemplary process can be extended to use specialized (possibly domain-specific) token weight functions instead of IDF token weights.

These and other objects, advantages and features of the invention are more fully understood from a review of an exemplary embodiment of the invention which is described in conjunction with the accompanying claims.

BRIEF DESCRIPTION OF THE DRAWINGS

FIG. 2 is a flow chart indicating a process of evaluating input records or tuples based on the contents of a reference table;

FIG. 3 is a depiction showing a computation of edit distance between two different tokens;

FIG. 4 is a depiction of a process for creating q-gram vectors from an input tuple having multiple tokens in different columns;

EXEMPLARY EMBODIMENT FOR PRACTICING THE INVENTION

Figure 1:
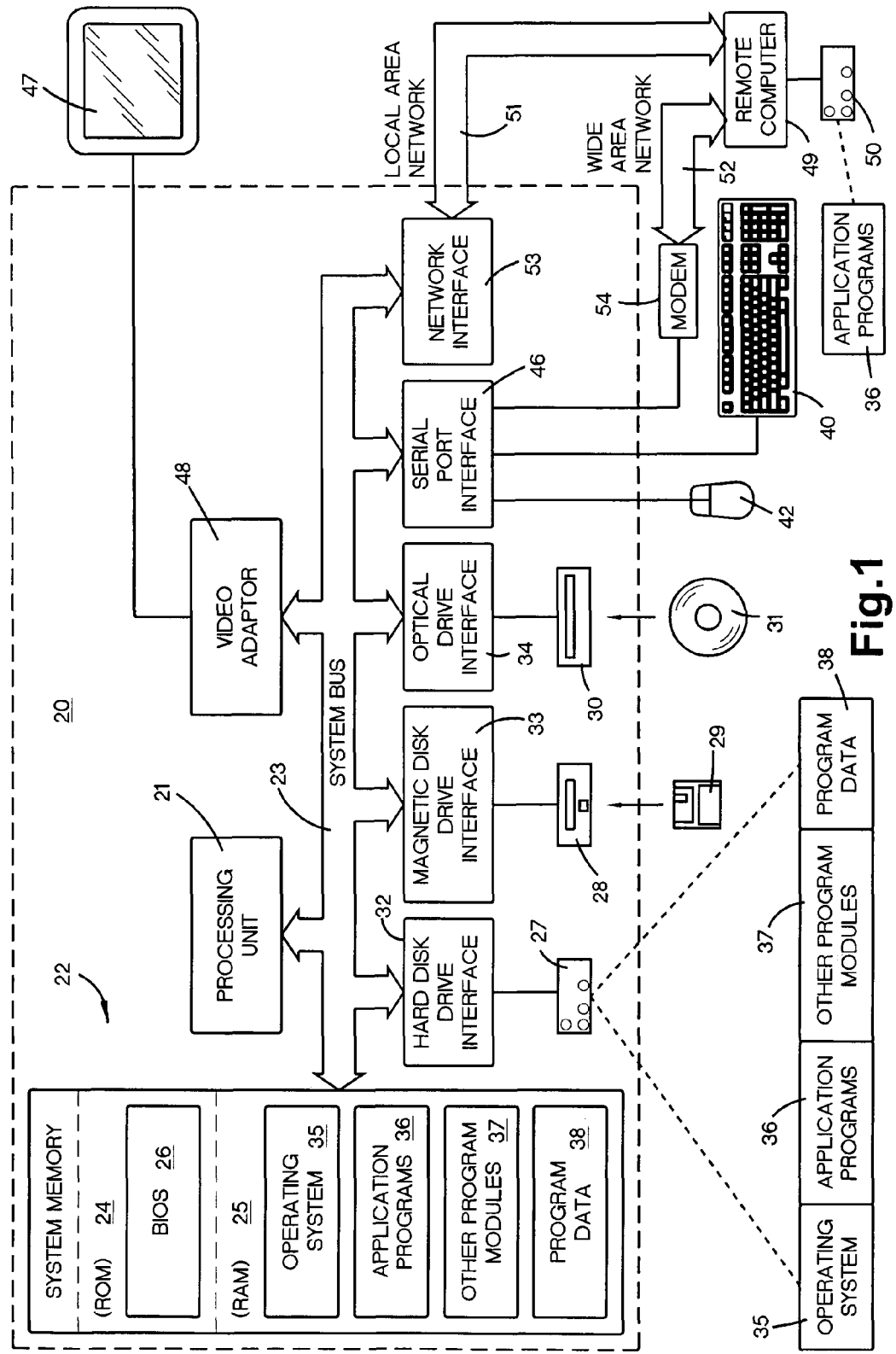
FIG. 1 is a schematic depiction of a representative computer system for implementing an exemplary embodiment of the invention.

FIG. 1 depicts an exemplary data processing system for practicing the disclosed invention utilizing a general purpose computer 20. A data mining software component that executes on the computer 20 accesses a database to extract data records stored within that database. An application program 36 either executing on the computer 20 or in communications with the computer 20 by means of a communications link such as a network 51 makes requests of a data mining engine.

As seen by referring to FIG. 1 the computer 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAM), read only memories (ROM), and the like, may also be used in the exemplary operating environment.

A number of program modules including the data mining software component 12 may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in networks, intranets and the Internet.

When used in a lan networking environment, the computer 20 is connected to the local network 51 through a network interface or adapter 53. When used in a wan networking environment, the computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Fuzzy Match

In accordance with an exemplary system, the similarity between an input tuple 110 (FIG. 2) and a reference tuple contained within a reference table 112 is the cost of transforming the input tuple into the reference tuple—the less the cost, the higher the similarity. An exemplary process depicted in FIG. 2 first checks to see if the input tuple 110 is an exact match with a tuple in the reference table 112. If this test 114 succeeds the tuple is entered. If the test 114 does not succeed, a fuzzy match process 116 is performed. The system tests 118 an output from this fuzzy match to determine if a threshold criteria has been satisfied and if the threshold was satisfied, the input tuple is corrected (presumably one of the record fields that is tested was incorrect) and loaded into the database. A user interface for initiating the exemplary process presents a user a means of choosing the reference table 112 and a source of one or more input tuples. Once the source and reference tables are determined, the interface allows the user to pick data attributes on which to check records for similarity. Not all text attributes must be selected during this process.

Prior art approaches addressing the fuzzy match operation either adopt proprietary domain-specific functions (e.g., Trillium's reference matching operation for the address domain) or use the string edit distance function for measuring similarity between tuples. A limitation of the edit distance is illustrated by the following example. The edit distance function would consider the input tuple I3 in Table 2 to be closest to R2 in Table 1, even though it is known that the intended target is R1. Edit distance fails because it considers transforming 'corporation' to 'company' more expensive than transforming 'boeing' to 'bon.' However, we know that 'boeing' and '98004' are more informative tokens than 'corporation' and so replacing 'corporation' with 'company' should be considered cheaper than replacing 'boeing' with 'bon' and '98004' with '98014.' In yet another example, note that the edit distance considers I4 closer to R3 than to its target R1. This is because it fails to capture the notion of a token or take into account the common error of token transposition.

TABLE 1

Organization Reference Relation

| ID | Org. Name | City | State | Zipcode |
|---|---|---|---|---|
| R1 | Boeing Company | Seattle | WA | 98004 |
| R2 | Bon Corporation | Seattle | WA | 98014 |
| R3 | Companions | Seattle | WA | 98024 |

TABLE 2

Input Organization Tuples

| Id | Org. Name | City | State | Zipcode |
|---|---|---|---|---|
| I1 | Beoing Company | Seattle | WA | 98004 |
| I2 | Beoing Co. | Seattle | WA | 98004 |
| I3 | Boeing Corporation | Seattle | WA | 98004 |
| I4 | Company Beoing | Seattle | NULL | 98014 |

The exemplary system uses a novel fuzzy match similarity (fms) function, which views a string as a sequence of tokens and recognizes the varying "importance" of tokens by explicitly associating weights quantifying their importance. Tuples matching on high weight tokens are more similar than tuples matching on low weight tokens. The system uses inverse document frequency (IDF) weights from the IR literature for quantifying the notion of token importance. Informally, the importance of a token decreases with its frequency, which is the number of times a token occurs in the reference relation. Even though the approach of weight association is common in the IR literature, the effective use of token weights in combination with data entry errors (e.g., spelling mistakes, missing values, inconsistent abbreviations) has not been considered in the prior art.

The notion of similarity between two tuples depends on the minimum cost of "transforming" one tuple into the other through a sequence of transformation operations (replacement, insertion, and deletion of tokens) where the cost of each transformation operation is a function of the weights of tokens involved. For example, it may be cheaper to replace the token 'corp' with 'corporation' than to replace 'corporal' with 'corporation' even though edit distances suggest otherwise. This notion of similarity based on transformation cost is similar to edit distance except that the system operates on tokens and explicitly consider their weights.

A goal of the exemplary fuzzy match process is to efficiently retrieve the K reference tuples closest to an input tuple. It is well-known that efficiently identifying the exact K nearest neighbors even according to the Euclidean and Hamming norms in high-dimensional spaces is computationally hard. Since the Hamming norm is a special case of the edit distance obtained by allowing only replacements, the identification of the exact closest K matches according to the disclosure fuzzy match similarity—which generalizes edit distance by incorporating token weights—is essentially hard.

The system adopts a probabilistic approach where the goal is to return the closest K reference tuples with high probability. The reference relation is pre-processed to build an index relation, called an error tolerant index (ETI) relation, for retrieving at run time a small set of candidate reference tuples, which are then compared with the input tuple. This retrieval process is probabilistically safe because it retrieves (with high probability) a superset of the K reference tuples closest to the input tuple. It is efficient because the superset is significantly (often by several orders of magnitude) smaller than the reference relation. The index relation ETI is implemented and maintained as a standard relation or table, and hence can be deployed over current operational data warehouses.

The Similarity Function

An understanding of the fuzzy match similarity (fms) function for comparing tuples is based on a few definitions.

Edit Distance: The edit distance $ed(s_1, s_2)$ between two strings $s_1$ and $s_2$ is the minimum number of character edit operations (delete, insert, and substitute) required to transform $s_1$ into $s_2$, normalized by the maximum of the lengths of $s_1$ and $s_2$. For the example shown in FIG. 3 the edit distance between the strings 'company' and 'corporation' is $7/11 \approx 0.64$, and the sequence of edit operations is shown. Vertical lines indicate either exact matches (cost is 0) or substitutions (cost is 1). Characters that are deleted or inserted have a unit cost.

Reference Relation: Let $R[tid, A_1, \ldots, A_n]$ be a reference relation where $A_i$ denotes the $i^{th}$ column. Assume that each $A_i$ is a string-valued attribute (e.g., of type varchar). Also assume that tid (for tuple identifier) is a key of R. Refer to a tuple whose tid attribute assumes value r as the tuple r. Use v[i] to denote the value as in the tuple $v[r, a_1, \ldots, a_n]$.

Tokenization: Let tok be a tokenization function which splits a string s into a set of tokens, tok(s), based on a set of delimiters (say, the white space characters). For example, tok(v[1]) of the tuple v=[R1, Boeing Company, Seattle, Wash., 98004] is {boeing, company}. Observe that the function ignores case while generating tokens. For tokens generated from attribute values of tuples, associate the column property—the column from which a token originates. For example, the column property of tokens in tok(v[col]) is col. Consequently, the token 'madison' in the name column of a customer relation is considered different from the token 'madison' in the city column. The token set tok(v) is the multiset union of sets $tok(a_1), \ldots, tok(a_n)$ of tokens from the tuple $v[r, a_1, \ldots, a_n]$. That is, if a token t appears in multiple columns, the process retains one copy per column in tok(v), distinguishing each copy by its column property. One says that a token t is in tok(v) if t is a member of some $tok(a_i)$, for $1 \leq i \leq n$.

Weight Function: The exemplary system adapts the IDF weight function to the relational domain by treating each tuple as a document of tokens. The motivation for this definition is clear from the following example—one expects the weight of token 'corporation' in the organization-name column to be less than that of 'united' since corporation is a frequent token in that column. Let the frequency of token t in column i, denoted freq(t, i), be the number of tuples v in R such that tok(v[i]) contains t. The IDF value, IDF(t, i), of a token t with respect to the $i^{th}$ column in the schema of R is computed as follows, when freq(t, i)>0, $$w(t, i) = IDF(t, i) = \log \frac{|R|}{freq(t, i)}$$

For a token t whose frequency in column i is 0, the system presumes that the token t is an erroneous version of some token in the reference tuple. Since the token to which it corresponds is unknown, the system defines the weight w(t, i) to be the average weight of all tokens in the $i^{th}$ column of relation R. For clarity in presentation, when the column property of a token is evident from the context, it is appropriate to use w(t) to denote w(t, i).

Fuzzy Similarity Function (fms)

The exemplary system employs a fuzzy similarity function which considers the following transformation operations: token replacement, token insertion, and token deletion. Each operation is associated with a cost that depends on the weight of the token being transformed. Let u and v be two tuples having a schema $R[A_1, \ldots, A_n]$. Consider the case where u is an input tuple and v is a reference tuple, and the system is interested in the cost of transforming u into v.

(i) Token replacement: The cost of replacing a token $t_1$ in tok(u[i]) by token $t_2$ from tok(v[i]) is $ed(t_1, t_2) \cdot w(t_1, i)$. If $t_1$ and $t_2$ are from different columns, the cost is infinite.

(ii) Token insertion: The cost of inserting a token t into u[i] is $c_{ins} \cdot w(t, i)$, where the token insertion factor $C_{ins}$ is a constant between 0 and 1.

(iii) Token deletion: The cost of deleting a token t from u[i] is w(t, i).

Observe that the costs associated with inserting and deleting the same token may be different. This asymmetry is useful, since it may be more likely for tokens to be left out during data entry than it is for spurious tokens to be inserted. Therefore, absence of tokens is not as heavily penalized.

The system ignores the tid attribute while comparing tuples. Transforming u into v requires each column u[i] to be transformed into v[i] through a sequence of transformation operations, whose cost are defined to be the sum of costs of all operations in the sequence. The transformation cost tc(u[i], v[i]) is the cost of the minimum cost transformation sequence for transforming u[i] into v[i]. The cost tc(u, v) of transforming u into v is the sum over all columns i of the costs tc(u[i], v[i]) of transforming u[i] into v[i].

$$tc(u, v) = \sum_i tc(u[i], v[i])$$

The minimum transformation cost tc(u[i], v[i]) can be computed using the dynamic programming algorithm used for edit distance computation. See T. F. Smith and M. S. Waterman. Identification of common molecular subsequences. *Journal of Molecular Biology*, 147:195-197, 1981.

Consider the input tuple u[Beoing Corporation, Seattle, Wash., 98004] in Table 2 and the reference tuple v[Boeing Company, Seattle, Wash., 98004]. The minimum cost transformation of u[1] into v[1] requires two operations—replacing 'beoing' by 'boeing' and replacing 'corporation' by 'company'. The function tc(u[1], v[1]) is the sum of costs of these two operations; assuming unit weights on all tokens, this is 0.97 by adding 0.33 for replacing 'beoing' with 'boeing' which are at an edit distance 0.33, and 0.64 for replacing the token 'corporation' 120 (FIG. 3) with the token 'company' 122 which are at an edit distance 0.64. In this example, only tc(u[1], v[1]) is nonzero among column-wise transformation costs.

Definition of fms:

The fuzzy match similarity function fms(u, v) between an input tuple u and a reference tuple v is defined in terms of the transformation cost tc(u, v). Let w(u) be the sum of weights of all tokens in the token set tok(u) of the input tuple u. Similarity between u and v is defined as:

$$fms(u, v) = 1 - \min\left(\frac{tc(u, v)}{w(u)}, 1.0\right)$$

In the above example involving I3 and R1, w(I3)=5.0 there are five tokens in tok(I1) and the weight of each token is 1.0. Therefore, fms(I3, R1)=1−0.97/5.0=0.806. It is useful to define fms asymmetrically because it is believed the cost of transforming a dirty input tuple into a clean reference tuple is different from the reverse transformation.

Edit Distance and fms

For a broad subclass of errors, it is useful to compare the weight assignment strategy implicitly adopted by the edit distance ed with that of the fuzzy match similarity fms, to isolate scenarios when they agree or disagree on fuzzy match. The comparison also justifies, although only informally, the belief that fms is the more appropriate choice in practice.

The exemplary system considers the subclass of order-preserving errors. Under this class of errors, an input tuple and its target reference tuple are consistent in the ordering among tokens after each input token is mapped to the closest matching reference token, and each input token is transformed to its counterpart in the reference tuple. Let $u_1, \ldots, u_m$ be the list of tokens in the input tuple u ordered according to their position in u. Let $v_1, \ldots, v_m$ be the similarly ordered list of tokens in the reference tuple v. In the class of order-preserving errors, for all i, the input token $u_i$ is transformed to the reference token $v_i$. Let ed(u, v) denote the total (minimum) number of edit operations for transforming each $u_i$ into $v_i$, normalized by max(L(u), L(v)) where the length L(z) of a tuple z is the sum of lengths of tokens $z_1, \ldots, z_p$ in tok(z), i.e., $L(z)=\Sigma|z_i|$. Now rewrite ed(u, v) to highlight the implicit weight assignment to the $u_i \rightarrow v_i$ token-mapping.

$$ed(u, v) = \frac{L(u)}{\max(L(u), L(v))} \sum_i \frac{\max(|u_i|, |v_i|)}{L(u)} ed(u_i, v_i) \quad (1)$$

Observe that the $u_i \rightarrow v_i$ mapping gets a weight proportional to $\max(|u_i|, |v_i|)/L(u)$. Therefore, ed implicitly assigns weights to token mappings in proportion to their lengths, i.e., longer tokens get higher weights. For example, 'corporation' to 'company' gets a higher weight than 'boeing' to 'bon' thus explaining why ed matches input tuple I3 (in Table 2) with R2 (in Table 1) instead of the correct target R1. Extensive empirical evidence from the IR application suggests the superiority of IDF weights to token lengths for capturing the notion of token importance.

The K-Fuzzy Match Problem:

Given a reference relation R, a minimum similarity threshold c (0<c<1), the similarity function f, and an input tuple u, find the set FM(u) of fuzzy matches of at most K tuples from R such that $$fms(u, v) \geq c, \text{ for all } v \text{ in } FM(u) \quad (i)$$

$$fms(u, v) \geq fms(u, v') \text{ for any } v \text{ in } FM(u) \text{ and } v' \text{ in } R\text{-}FM(u) \quad (ii)$$

Observe that by setting the minimum similarity threshold c to be zero, the system responds to a user interested in all closest K reference tuples. When more than K−i+1 reference tuples are tied for the $i^{th}, \ldots, K^{th}$ (i>1) best fuzzy matches, the system breaks ties by choosing an arbitrary subset of the tied reference tuples such that the total number of returned fuzzy matches is K.

Given an input tuple u, the goal of the fuzzy match process is to identify the fuzzy matches—the K reference tuples closest to u. A naïve algorithm scans the reference relation R comparing each tuple with u. A more efficient approach practiced in accordance with an exemplary embodiment builds an "index" on the reference relation for quickly retrieving a superset of the target fuzzy matches. Standard index structures like B+-tree indexes cannot be deployed in this context because they can only be used for exact or prefix matches on attribute values.

In an exemplary embodiment, during a pre-processing phase, additional indexing information for efficiently implementing the fuzzy match operation is performed. The additional information is stored as a standard database relation, and an index for this relation using standard B+-trees provides fast, exact lookups. This indexed relation is referred to as the error tolerant index (ETI). A challenge is to identify and to effectively use the information in the indexed relation. The exemplary embodiment derives from fms an easily indexable similarity function $fms^{apx}$ with the following characteristics. (i) $fms^{apx}$ upper bounds fms with high probability. (ii) The system can build the error tolerant index (ETI) relation for efficiently retrieving a small candidate set of reference tuples whose similarity with the input tuple u, as per $fms^{apx}$, is greater (probabilistically) than the minimum similarity threshold c. Therefore, with a high probability the similarity as per fms between any tuple in the candidate set and u is greater than c. From this candidate set, the system returns the K reference tuples closest to u as the fuzzy matches.

Approximation of fms

To enhance efficiency, one goal of the exemplary embodiment is to derive $fms^{apx}$ an approximation of the fuzzy match similarity function fms for which the system can build an indexed relation. $fms^{apx}$. This is a pared down version of fms obtained by (i) ignoring differences in ordering among tokens in the input and reference tuples, and (ii) by allowing each input token to match with the "closest" token from the reference tuple. Since disregarding these two distinguishing characteristics while comparing tuples can only increase similarity between tuples, $fms^{apx}$ is an upper bound of fms.

The tuples [boeing company, Seattle, Wash., 98004] and [company boeing, Seattle, Wash., 98004] which differ only in the ordering among tokens in the first field are considered identical by $fms^{apx}$. In $fms^{apx}$, the system measures the closeness between two tokens through the similarity between sets of substrings—called q-gram sets—of tokens (instead of edit distance between tokens used in fms). Further, this q-gram set similarity is estimated accurately by the commonality between small probabilistically chosen subsets of the two q-gram sets. This property can be exploited to build an indexed relation for fms$^{apx}$ because for each input tuple the system only has to identify reference tuples whose tokens share a number of chosen q-grams with the input tuple. First, define the approximation of the q-gram set similarity between tokens. In Lemma 2, (below) this similarity is related with the edit distance between tokens using an "adjustment term" which only depends on the value of q introduced below.

Q-gram Set: Given a string s and a positive integer q, the set $QG_q(s)$ of q-grams of s is the set of all size q substrings of s. For example, the 3-gram set $QG_3$("boeing") is the set of substrings {boe, oei, ein, ing}. Because q is fixed to be a constant, it is convenient to use QG(s) to denote $QG_q(S)$.

Jaccard Coefficient: The Jaccard coefficient $sim(S_1, S_2)$ between two sets $S_1$ and $S_2$ is $$\frac{|S1 \cap S2|}{|S1 \cup S2|}.$$

Min-hash Similarity: Let U denote the universe of strings over an alphabet Σ, and $h_i: U \rightarrow N$, i=1, ..., H be H hash functions mapping elements of U uniformly and randomly to the set of natural numbers N. Let S be a set of strings. The min-hash signature mh(S) of S is the vector $[mh_1(S), \ldots, mh_H(S)]$ where the $i^{th}$ coordinate $mh_i(S)$ is defined as $$mh_i(S) = \arg\min_{a \in S} h_i(a).$$

Let I[X] denote an indicator variable over a boolean X, i.e., I[X]=1 if X is true, and 0 otherwise. Then, $$E[sim(S_1, S_2)] = \frac{1}{H} \sum_{i=1}^{H} I[mh_i(S_1) = mh_i(S_2)]$$

Computing a min-hash signature is described in A. Broder. "On the resemblance and containment of documents." In *Compression and Complexity of Sequences (SEQUENCES '97)*, 1998. and E. Cohen. "Size estimation framework with applications to transitive closure and reachability." *Journal of Computer and System Sciences*, 1997.

The process of selecting an element in the min-hash signature is like throwing darts at a board and stopping when an element of S. is hit. Hence, the probability that an element in $S_1 \cap S_2$ is hit before another element in $S_1 \cup S2$ is equal to $sim(S_1, S_2)$. Now define token similarity in terms of the min-hash similarity between their q-gram sets. Let q and H be positive integers. The min-hash similarity $sim_{mh}(t_1, t_2)$ between tokens $t_1$ and $t_2$ is:

$$sim_{mh}(t_1, t_2) = \frac{1}{H} \sum_{i=1}^{H} I[mh_i(QG(t_1)) = mh_i(QG(t_2))]$$

Using the similarity function fms$^{apx}$, it can be shown that its expectation is greater than fms, and (ii) the probability of fms$^{apx}$ being greater than fms can be made arbitrarily large by choosing an appropriate min-hash signature size.

Definition of fms$^{apx}$:

Let u, v be two tuples, and let $d_q = (1 - 1/q)$ be an adjustment term where q is the size of q-gram length.

$$fms^{apx}(u, v) = \frac{1}{w(u)} \sum_{i} \sum_{t \in tok(u[i])} w(t) \cdot \max_{r \in tok(v[i])} \left( \frac{2}{q} sim_{mh}(QG(t), QG(r)) + d_q \right)$$

Consider the tuple I4 in Table 2 and the tuple R1 in Table 1. Suppose q=3 and H=2. We use the notation t:w to denote a token with weight w. Suppose the tokens and their weights in 14 are company:0.25, beoing:0.5, Seattle:1.0, 98004:2.0; their total weight is 3.75. Suppose their min-hash signatures 130-134 (FIG. 4) are [eoi, ing], [com, pan], [sea, ttl], [980, 004], respectively. The tokens in R1 are boeing, company, Seattle, Wash., 98004. Suppose their min-hash signatures are [oei, ing], [com, pan], [sea, ttl], [wa], [980, 004], respectively. Then, 'company' matches with 'company', 'beoing' with 'boeing', 'Seattle' with 'Seattle', '98004' with '98004'. The score from matching 'beoing' with 'boeing' is: w(beoing)*(⅔*0.5+(1−⅓))=w(beoing). Since every other token matches exactly with a reference token, fms$^{apx}$(I4, R1)=3.75/3.75. In contrast, fms(I4, R1) will also consider the cost of reconciling differences in order among tokens between I4 and R1, and the cost of inserting token 'wa'. Hence, fms(I4, R1) is less than fms$^{apx}$(I4, R1).

Lemma 1: Let $0 < \delta < 1$, $\epsilon > 0$, $H \geq 2\delta^{-2} \log \epsilon^{-1}$. Then $$E[fms^{apx}(u, v)] \geq fms(u, v) \quad \text{(i)}$$

$$P(fms^{apx}(u, v) \leq (1-\epsilon) fms(u, v)) \leq \epsilon \quad \text{(ii)}$$

Sketch of Proof: Using the following definitions.

$$f_1(u, v) = \frac{1}{w(u)} \sum_{i} \sum_{t \in tok(u[i])} w(t) \cdot \max_{r \in tok(v[i])} (1 - ed(t, r))$$

$$f_2(u, v) = \frac{1}{w(u)} \sum_{i} \sum_{t \in tok(u[i])} w(t) \cdot \max_{r \in tok(v[i])} \left( \frac{2}{q} sim(QG(t), QG(r)) + d_q \right)$$

Result (i) falls out of the following sequence of observations.

(i) Ignoring the ordering among tokens while measuring f, and allowing tokens to be replaced by their best matches always results in over estimating fms. Therefore, $f_1(u, v) \geq fms(u, v)$.

(ii) Edit distance between strings is approximated by the similarity between the sets of q-grams (Lemma 4.2 below), and max(|t|, |r|)≥|QG(t) ∪ QG(r)|/2. Hence, $f_2(u, v) \geq f_1(u, v)$.

(iii) Min-hash similarity between tokens is an unbiased estimator of the Jaccard coefficient between q-gram sets of tokens. Therefore, $E[fms^{apx}(u, v)] = f_2(u, v) \geq fms(u, v)$.

Since $E[fms^{apx}(u, v)] = f_2(u, v) \geq fms(u, v)$ for all H>0, splitting fms$^{apx}$(u, v) into the average of H independent functions $f_1', \ldots, f_H'$ one for each min-hash coordinate such that $f_i'$ has the same expectation as fms$^{apx}$ and using Chernoff bounds, one has the following inequality, which yields Result (ii).

$$E[X < (1-\delta)f(u, v)] \leq E[X < (1-\delta)E[X]] \leq e^{-\frac{\delta^2 H f_2(u,v)}{2}}$$

Lemma 2: Let $t_1$, $t_2$ be two tokens, and $m=\max(|t_1|, |t_2|)$. Let $d=(1-1/q)\cdot(1-1/m)$. Then, $$1 - ed(s_1, s_2) \leq \frac{|QG(s_1) \cap QG(s_2)|}{mq} + d$$

Because the probability $P(\text{fms}^{apx}(u, v) \geq (1-\delta)\text{fms}(u, v))$ can be increased arbitrarily, it is appropriate to say that $\text{fms}^{apx}$ upper bounds fms.

The Error Tolerant Index (ETI)

A primary purpose of the error tolerant index ETI is to enable, for each input tuple u, the efficient retrieval of a candidate set S of reference tuples whose similarity with u (the input tuple) is greater than the minimum similarity threshold c. The value of $\text{fms}^{apx}(u, v)$ is measured by comparing min-hash signatures of tokens in tok(u) and tok(v). Therefore, to determining the candidate set, the system must efficiently identify for each token t in tok(u), a set of reference tuples sharing min-hash q-grams with that of t. Consider the example input tuple [Beoing Company, Seattle, Wash., 98004] shown in FIG. 4. The topmost row in the figure lists tokens in the input tuple, the next row lists q-gram signatures 130-134 of each token. The lowest row lists sets ($S_1$ through $S_9$) of tuple identifiers or tids of reference tuples with tokens whose min-hash signatures contain is the corresponding q-gram. For example, the set $S_1 \cup S_2$ is the set of tids of reference tuples containing a token in the Org. Name column that shares a min-hash q-gram with 'beoing'. Extending this behavior to q-gram signatures of all tokens, the union of all $S_i$'s contains the candidate set S. In order to identify such sets of token identifiers or tids, the system stores in the ETI each q-gram s along with the list of all tids of reference tuples with tokens whose min-hash signatures contain s.

To formally describe the ETI and its construction, let R be the reference relation, and H the size of the min-hash signature. ETI is a relation with the following schema: [QGram, Coordinate, Column, Frequency, Tid-list] such that each tuple e in ETI has the following semantics. e[Tid-list] is a list of tids of all reference tuples containing at least one token t in the field e[Column] whose e[Coordinate]-th min-hash coordinate is e[QGram]. The value e[Frequency] is the number of tids in e[Tid-list]. Constructing a tuple [s, j, i, frequency, tid-list] in ETI requires that the system know the list of all reference tuple tids containing $i^{th}$ column tokens with s as their $j^{th}$ min-hash coordinate. One method of computing all ETI tuples in main-memory, by scanning and processing each reference tuple, is not scalable because the combined size of all tid-lists can easily be larger than the amount of available main memory. To build the ETI efficiently, the system leverages the underlying database system by first building a temporary relation called the pre-ETI with sufficient information and then construct the ETI relation from the pre-ETI relation using SQL queries.

The schema of the pre-ETI is: [QGram, Coordinate, Column, Tid]. The system scans the reference relation R processing each tuple v as follows. It tokenizes v, and for each $i^{th}$ column token t in tok(v), it determines its min-hash signature mh(t) of size H. It then inserts into a pre-ETI relation a row [q, j, i, r] for the $j^{th}$ min-hash coordinate in mh(t). For example, if the size-2 signature of the token 'company' belonging to column 1 of the tuple R1 is [com, pan], then the system inserts the rows [com, 1, 1, R1], [pan, 1, 1, R1] into the pre-ETI. In practice, such insertions can be batched.

All tuples required to compute any one ETI tuple occur together in the result of the pre-ETI-query: "select QGram, Coordinate, Column, Tid from pre-ETI order by QGram, Coordinate, Column, Tid." The system scans the result of the pre-ETI-query, and for a group of tuples corresponding to the q-gram s which occurs as the $j^{th}$ min-hash coordinate of (multiple) tokens in the $i^{th}$ column, the system inserts the tuple [s, j, i, freq(s, j, i), tid-list] in ETI, where freq(s, j, i) is the size of the group, and tid-list the list of all tids in the group. q-grams whose frequencies are above a large threshold, called the stop q-gram threshold (set to 10000 in one implementation), are considered stop tokens. For such q-grams, the system inserts a NULL value in the tid-list column. Finally, a clustered index is built on the [QGram, Coordinate, Column] attribute combination of the ETI relation so that queries looking up ETI on [QGram, Coordinate, Column] combinations are answered efficiently.

Figures 6A, 6B:
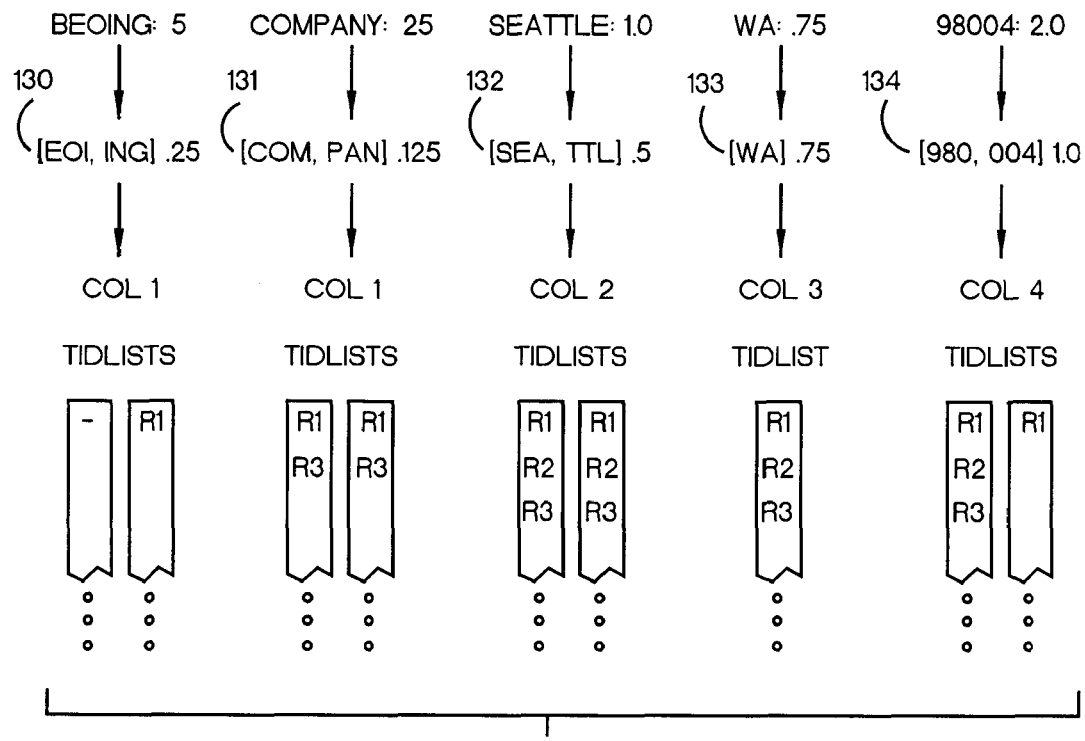
FIGS. 6A and 6B show a construction of a hash table for tabulating of a reference score for reference records based on an analysis of an input record.

An example ETI relation for the reference relation in Table 1 with q=3 and H=2 is shown in Table 3 and FIG. 6A. If the length of a token is less than q, then it is assumed that its min-hash signature consists of the token itself. The tuple [R1, Boeing Company, Seattle, Wash., 98004] in Table 1 with min-hash signatures {[oei, ing], [com, pan], [sea, ttl], [wa], [980, 004]} for its tokens, respectively, has the tid R1 in the tid-lists of each of these q-grams.

TABLE 3

An Example ETI Relation

| Q-gram | Coordinate | Column | Frequency | Tid-list |
|--------|------------|--------|-----------|----------|
| oei | 1 | 1 | 1 | {R1} |
| ing | 2 | 1 | 1 | {R1} |
| com | 1 | 1 | 2 | {R1, R3} |
| pan | 2 | 1 | 2 | {R1, R3} |
| bon | 1 | 1 | 1 | {R2} |
| orp | 1 | 1 | 1 | {R2} |
| ati | 2 | 1 | 1 | {R2} |
| sea | 1 | 2 | 3 | {R1, R2, R3} |
| ttl | 2 | 2 | 3 | {R1, R2, R3} |
| wa | 1 | 3 | 3 | {R1, R2, R3} |
| 980 | 1 | 4 | 3 | {R1, R2, R3} |
| 004 | 2 | 4 | 1 | {R1} |
| 014 | 2 | 4 | 1 | {R2} |
| 024 | 2 | 4 | 1 | {R3} |

Query Processing

Figure 5:
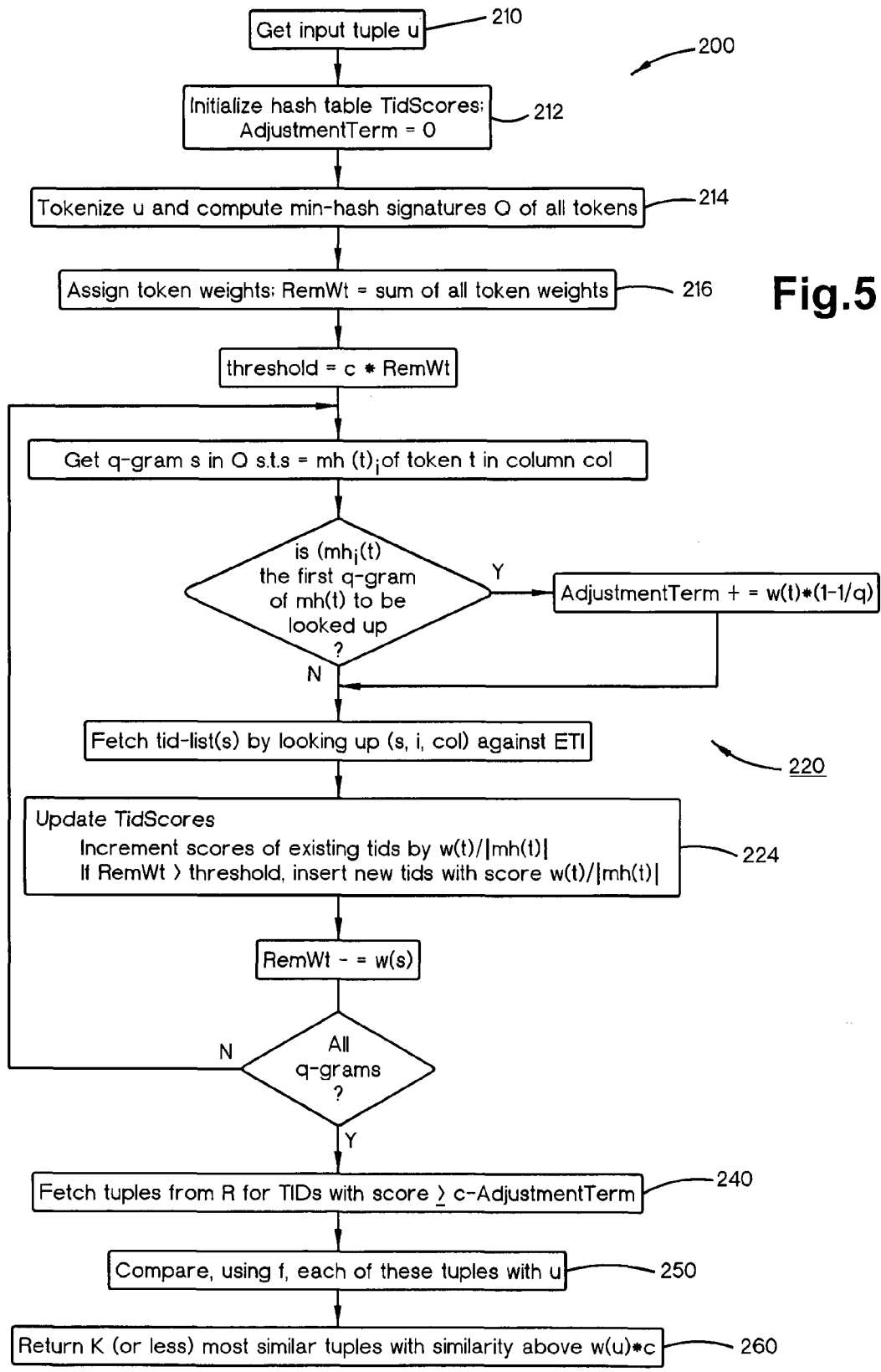
FIG. 5 is a more detailed flowchart illustrating the processing steps of an exemplary embodiment of the present invention.

FIG. 5 depicts steps for a process that performs fuzzy match queries—queries asking for K fuzzy matches of an input tuple u whose similarities (as per fms) with u are above a minimum similarity threshold c. The goal is to reduce the number of lookups against the reference relation by effectively using the ETI of table 3. A first embodiment uses a basic algorithm, which fetches tid-lists by looking up from the ETI all q-grams found in min-hash signatures of all tokens in u. An alternate embodiment uses an optimization called optimistic short circuiting, which exploits differences in token weights and the requirement to fetch only the K closest tuples to significantly reduce the number of ETI lookups. For efficient lookups, it is assumed that the reference relation R (Table 1) is indexed on the Tid attribute, and the ETI relation is indexed on the [QGram, Coordinate, Column] attribute combination.

The FIG. 5 process for performing the fuzzy match query, starts with the receipt 210 of an input tuple u. The process of identifying matches involves updating a table 300 (FIG. 6B) of tuple id's and score for those id's and at a step 212 this table is initialized. For each token t in tok(u), the process needs to compute its IDF weight w(t), which requires the frequency of t. These frequencies could be part of the ETI and could be fetched by issuing a SQL query for each token. However, assume that frequencies of tokens can be quickly looked up from a main memory cache called a token-frequency cache that is based on the reference table (table 1). The FIG. 5 process determines 214 the min-hash signature mh(t) of each token t. (If $|t| \leq q$ (the q-gram size), the process defines mh(t)=[t].) Next the process assigns 216 the weight w(t)/|mh(t)| to each q-gram in mh(t). In the example below the size of mh(t) is 2 or the size of the vector produced.

Using the ETI, the process determines 220 a candidate set S of reference tuple tids whose similarity (as per fms$^{apx}$ and hence fms) with the input tuple u is greater than c. The process then fetches from the reference relation all tuples in S to verify 240 whether or not their similarities with u (as per fms) are truly above c. Among those tuples which passed the verification test, the process returns 250 the K tuples with the K highest similarity scores.

Candidate Set Determination

The exemplary system computes the candidate set S as the union of sets $S_k$, one for each q-gram $q_k$ in the min-hash signatures of tokens in tok(u). For a q-gram $q_k$ which is the $i^{th}$ coordinate in the min-hash signature mh(t) of a token t in the $j^{th}$ column, $S_k$ is the tid-list from the record $[q_k, i, j, freq(q_k, i, j), S_k]$ in ETI. Observe that the lookup for $[q_k, i, j, freq(q_k, i, j), S_k]$ is efficient because of the index on the required attribute combination of ETI. Each tid in $S_k$ is assigned a score that is proportional to the weight w(t) of the token t in the reference table. If a tuple with tid r is very close to the input tuple u, then r is a member of several sets $S_k$ and hence gets a high overall score. Otherwise, r has a low overall score. Tids that have an overall score greater than w(u)·c minus an adjustment term applied at the step 230—a correction to approximate the edit distance between tokens with the similarity between their q-gram sets—make up the candidate set.

During the process of looking up tid-lists corresponding to q-grams, the system maintains the scores of tids in these tid-lists in the hash table 300. At any point, the score of a tid equals the sum of weights of all q-grams whose tid-lists it belongs to. The weight w($q_k$) assigned to a q-gram $q_k$ in the min-hash signature mh($t_i$) of a token $t_i$ is w($t_i$)/|mh($t_i$)|. If a tid in $S_k$ is already present in the hash table 300, then its score is incremented by w($q_k$). Otherwise, the process adds the tid to the hash table with an initial score of w($q_k$). After all q-grams in the signatures of input tokens are processed, the process selects 230 a tid r and add it to the candidate set S only if its score is above w(u)·c (minus the adjustment term). The adjustment term is a correction term to approximate the edit distance between tokens with the similarity between their q-gram sets. It is equal to the sum over all input tokens t of d (as defined in Lemma 2) times the weight of the input token.

An optimization to the after-the-fact filtering of tids with low scores described above is to add a tid to the hash table 300 only if the score it can potentially get after all is min-hash q-grams are processed is greater than the threshold. We add a new tid to the hash table only if the total weight, which is an upper bound on the score a new tid can get, of all min-hash q-grams yet to be looked up in the ETI is greater than or equal to w(u)·c. This optimization is applied at a step 224 and significantly reduces the number of tids added to the hash table.

The procedure of FIG. 5 is illustrated with the example input tuple I1 in Table 2 and the ETI in Table 3 along with the hash table 300 depicted in FIG. 6B. Suppose q=3 and H=2. Use the notation [q1, q2]: w to denote the min-hash signature [q1, q2] with each q-gram assigned a weight of w. The tokens and their weights in I1 are beoing: 0.5, company: 0.25, Seattle: 1.0, wa: 0.75, 98004: 2.0; their total weight is 4.5. Suppose their min-hash signatures are [eoi, ing]:0.25, [com, pan]:0.125, [sea, ttl]:0.5, [wa]:0.75, [980, 004]:1.0. The system accesses the ETI (table 3) to fetch the following tid-lists: [{ }, {R1}], [{R1, R3}, {R1, R3}], [{R1, R2, R3}, {R1, R2, R3}], [{R1, R2, R3}], [{R1, R2, R3}, {R1}]. For the purpose of this example, ignore the adjustment term. R1 gets an overall score of 4.25, R2 a score of 2.75, and R3 3.0. Depending on the threshold, the candidate set is a subset of {R1, R2, R3}. For the example in FIG. 4, suppose the process looked up min-hash q-grams 'eoi', 'ing', 'com', 'pan', 'sea', 'ttl'. While processing the q-gram 'wa', the process adds new tids to the hash table only if 0.75 (weight of wa)+2.0 (the total weight of the remaining q-grams from the input tuple) is greater than w(u)·c where w(u) is the total weight of the input tuple.

The basic process of FIG. 5 retrieves the correct fuzzy matches with a high probability. For the purpose of the formal guarantee in Theorem 1, it is assume that no q-gram is classified as a stop token. Alternatively, the stop q-gram threshold is set to at least |R|.

Theorem 1: Let $0<\delta<1$, $\epsilon>0$, $H \geq 2\delta^{-2} \log \epsilon^{-1}$. The basic query processing process of, FIG. 5 returns the K reference tuples closest, as per fms, to the input tuple with a probability of at least 1-$\epsilon$.

Optimistic Short Circuiting (OSC)

In accordance with the basic process of FIG. 5, the process fetches tid-lists by looking up ETI of all q-grams in min-hash signatures of all tokens. In one embodiment of the invention there is a short circuiting optimization to significantly reduce the number of ETI lookups. The intuition is as follows. Weights of input tokens (and hence weights of min-hash q-grams) often vary significantly. Therefore, the system may look up the ETI on just a few important q-grams and—if a fetching test succeeds—optimistically short circuit the process by fetching the current closest K reference tuples. If it is able to efficiently verify—via a stopping test—whether these tuples are actually the closest K tuples then, a significant amount of work is saved: (i) avoid ETI lookups on a number of unimportant q-grams, and (ii) avoid initializing and incrementing similarity scores in the hash table for large numbers of tids associated with unimportant, low weight and high-frequency q-grams.

Consider the input tuple Ii, the reference relation in Table 1, and the ETI relation in Table 3. Suppose K, the number of tuples sought=1, q=3, and H=2. The tokens along with weights in I1 are beoing:0.5, company:0.25, Seattle:1.0, wa:0.75, 98004:2.0; their total weight is 4.5. Suppose their min-hash signatures are [eoi, ing]:0.25, [com, pan]:0.125, [sea, ttl]:0.5, [wa]:0.75, [980, 004]:1.0. For the purpose of this example, the adjustment terms are ignored. Order q-grams in the decreasing order of their weights, and fetch their tid-lists in this order. First fetch the tid-list {R1, R2, R3} of q-gram '980.' The process does not distinguish between the K and $(K+1)^{th}$ (here, $1^{st}$ and $2^{nd}$) best scores. So, it fetches the list {R1} of the next most important q-gram, that is '004'. At this point, R1 has the best score of 2.0, and R2 and R3 have scores of 1.0. The process now estimates the score for RI over all q-grams of the input tuple to be, say, 4.5. The estimate is obtained by extrapolating (say, using a linear extrapolation function) the current score to the situation when all tokens would have been retrieved. That is, if the total weight of all tokens is W, the total weight of tokens looked in the ETI index is W', and the current score is x, then the estimated overall score is x*W/W'. The best possible score $s^2_{next}$ that R2 (the current K+1$^{th}$ highest score tid) can get equals its current score plus the sum of weights of all remaining q-grams: 1.0+(4.5−2.0)=3.5. Observe that $s^2_{next}$ is also greater than the best possible (K+1)$^{th}$ similarity—as per fms$^{apx}$ and hence fms—among all reference tuples in R. Because 4.5>3.5, the process anticipates the reference tuple R1 to be the closest fuzzy match, fetches it from R, and compute fms(u, R1). If fms(u, R1)≧3.5/4.5, the process stops and return R1 as the closest fuzzy match thus avoiding looking up and processing tid-lists of the remaining q-grams of the input tuple: eoi, ing, com, pan, sea, ttl, wa. However, if fms(u, R1)≦3.5, the process continues fetching the next most important q-gram (here 'wa').

The robustness of the stopping test ensures that inaccuracy in estimating the score of R1 over all q-grams does not affect the correctness of the final result. However, it impacts performance. If it over-estimates, it may fetch more reference tuples and realize they are not good matches, and if it under-estimates then it may perform a higher number of ETI lookups. Note, short circuiting is especially effective if only the closest reference tuple is sought rather than the K closest tuples with K>1.

The query processing algorithm enhanced with optimistic short circuiting (OSC) differs from the basic algorithm in two aspects: (i) the order in which the system looks up q-grams against ETI, and (ii) the additional short-circuiting procedure that is potentially invoke after looking up each q-gram. Pseudo code is almost the same as that in FIG. 5 except for two additional steps: the ordering of tokens and the short circuiting procedure. The system orders Q, the set of all q-grams in the min-hash signatures of an input tuple in the decreasing order of their weights, where each q-gram s in the signature mh(t) is assigned a weight w(t)/|mh(t)|. After fetching tid-list(s) and processing tids in the tid-list, it additionally performs the short circuiting procedure (whose pseudo code is shown in listing 1 below). If the short circuiting procedure returns successfully, the process of FIG. 5 stops and returns the closest match.

current K candidate tuples as the best K fuzzy matches. On failure, it processes more q-grams.

The fetching and stopping tests are summarized as follows. Let w(Q) denote the sum of weights of all q-grams in a set of q-grams Q. Let $Q_p=[q_1, \ldots, q_p]$ denote the ordered list of q-grams in min-hash signatures of all tokens in the input tuple u such that $w(q_i) \geq w(q_{i+1})$. Let $Q_i$ denote the set of q-grams $[q_1, \ldots, q_i]$. Let $ss_i(r)$ denote the similarity score of the tid r plus the adjustment term after processing tid-lists of $q_1, \ldots, q_i$. Suppose $r^i_1, \ldots, r^i_K, r^i_{K+1}$ are the tids with the highest K+1 similarity scores after looking up q-grams $q_1, \ldots, q_i$. Informally, the fetching test returns true if and only if the "estimated overall score" of $r^i_K$ is greater than the "best possible overall score" of $r^i_{K+1}$. We compute the estimated overall score of $r^i_K$ by linearly extrapolating its current similarity score $ss_i(r^i_K)$ to $ss_i(r^i_K) \cdot w(Q_p)/w(Q_i)$, and the best possible overall score of $r^i_{K+1}$ by adding the weight $(w(Q_p)-w(Q_i))$ of all q-grams yet to be fetched to $ss_i(r^i_{K+1})$.

$$\text{Fetching Test} = \begin{cases} \text{True,} & \frac{ss_i(r^i_K)}{w(Q_i)} \cdot w(Q_p) > ss_i(r^i_{K+1}) + (w(Q_p) - w(Q_i)) \\ \text{False,} & \text{Otherwise} \end{cases}$$

The stopping test returns successfully if fms(u, $r^i_j$)≧$ss_i$($r^i_{K+1}$)+w($Q_p$)−w($Q_i$), for all 1≦j≦K. Since $ss_i$($r^i_{K+1}$)+w($Q_p$)−w($Q_i$) is the maximum possible overall score any candidate outside the current top K candidates can get, if the similarities (as per fms) are greater than this upper bound we can safely stop because we are sure that no other reference tuple will get a higher score. The following theorem (whose proof we omit) formalizes the guarantees of the algorithm. Again, for the purpose of obtaining the formal guarantee, we assume that no q-gram is classified as a stop token. Theorem 2: Let 0<δ<1,ε>0, H≧2δ$^{-2}$ log ε$^{-1}$. The query processing algorithm enhanced with optimistic short circuiting returns the K reference tuples closest according to fms to the input tuple with probability at least 1−ε.

---

Listing 1 Short Circuiting

---

BOOLEAN ShortCircuit_ETILookups(TidScores, TupleList)
//FetchingTest($s_K$, $s_{K+1}$)
1    Identify K+1 tids $r^i_1,\ldots,r^i_{K+1}$ with the highest similarity scores
2    Estimate the score $s_{opt}^K$ over $Q_p$ of $r^i_K$ and determine the best possible score $s_{best}^{K+1}$ over $Q_p$ of $r^i_{K+1}$
3    If $s_{opt}^K > s_{best}^{K+1}$
4        Fetch R tuples $r^i_1,\ldots,r^i_K$
5        Compare them with u to determine fms(u, $r^i_1$), ..., fms(u, $r^i_K$)
//Stopping Test
6        If fms(u, $r^i_j$) ≧$s_{best}^{K+1}$ for all j, then assign TupleList = <$r^i_1,\ldots,r^i_K$> and return True;
         else, return false

---

The short circuiting procedure consists of a fetching test and a stopping test. The fetching test (Step 3 in listing 1) evaluates whether or not the current K tids could be the closest matches. On failure, the process returns and continues processing more q-grams. If successful, the process fetches the current best K candidates from the reference relation R (Step 4, listing 1), and compares (using fms) each of them with the input tuple u (Step 5, listing 1). The stopping test (Step 6, listing 1) confirms whether or not u is more similar to the retrieved tuples than to any other reference tuple. On success, the process stops and returns the Resource Requirements The expensive steps of the ETI building phase are: (1) scan of the reference relation R, (2) writing the pre-ETI, (3) sorting the pre-ETI, and (4) writing the ETI. The total I/O cost during these phases is O($m_{avg}$·q·H·|R|+|ETI|·(12+q)) where $m_{avg}$ is the average number of tokens in each tuple, and |ETI| is the number of tuples in ETI which is less than H·n·|Σ|$^q$—the maximum number of q-grams times H times the number of columns in R—given that Σ is the alphabet over which tokens in R are formed from. The expensive steps for processing an input tuple are: (1) looking up ETI for tid-lists of q-grams, (2) processing tid-lists, and (3) fetching tuples in the candidate set. The number of ETI lookups is less than or equal to the total number of q-grams in signatures of all tokens of a tuple. On average, this number is $m_{avg} \cdot H$. The number of tids processed per tuple and the size of the candidate set is bounded by the sum of frequencies of all q-grams in the signatures of tokens in a tuple. In practice, the candidate set sizes are several orders of magnitude less than the above loose upper bound. Due to its dependence on the variance of token weights of input tuples, the reduction in the number of ETI lookups due to OSC is hard to quantify.

Token-Frequency Cache

In accordance with an exemplary embodiment, the frequencies of tokens are maintained in a main memory token-frequency cache enabling quick computation of IDF weights. Given current main memory sizes on desktop machines, this assumption is valid even for very large reference relations. For example, a relation Customer [Name, city, state, zip code] with 1.7 million tuples has approximately 367,500 distinct tokens (even after treating identical token strings in distinct columns as distinct tokens). Assuming that each token and its auxiliary information (4 bytes each for column and frequency) together require on average 50 bytes, the exemplary embodiment only requires 18.375 MB for maintaining frequencies of all these tokens in main memory. In those rare cases when the token-frequency cache does not fit in main memory, other strategies are possible.

Cache Without Collisions

An alternative system-reduces the size of the token-frequency cache by mapping each token to an integer using a 1-1 hash function (e.g., MD5 [21]). The system now only require 24 bytes of space (as opposed to a higher number earlier) for each token: the hash value (16 bytes), the column to which it belongs (4 bytes), and the frequency (4 bytes). Now, the token-frequency cache for the 1.7 million tuple customer relation requires only around 10 MB.

Cache with Collisions

Another alternative is to restrict the size of the hash table to at most M entries allowing multiple tokens to be collapsed into one bucket. The impact on the accuracy and correctness of the fuzzy matching algorithm depends on the collision probability. The more the collisions, the more likely the system will compute incorrect token weights.

Alternative Extensions

Indexing Using Tokens

The previously described embodiments can now extend use of the ETI and the fuzzy match query processing algorithm to effectively use tokens for further improving efficiency. Consider the input tuple I1 [I1, Beoing Company, Seattle, Wash., 98004] in Table 2. All tokens except 'beoing' are correct, and this characteristic of most tokens in an input tuple being correct holds for a significant percentage of input tokens. Tokens are higher level encapsulations of (several) q-grams. Therefore, if in building the ETI the process also indexes reference tuples on tokens, the process can directly look up ETI against these tokens instead of several min-hash signatures thus potentially improving efficiency of the candidate set retrieval. However, a challenge of this embodiment is to ensure that the candidate set that is fetched contains all K fuzzy matching reference tuples. If the system does not look up ETI on the q-gram signature of a token, say 'beoing', it may not consider reference tuples containing a token 'boeing' close to 'beoing'. And, it is possible that the closest fuzzy match happens to be the reference tuple containing 'boeing'. The challenge is to gain efficiency without losing accuracy.

An alternate approach is to split importance of a token equally among itself and its min-hash signature by extending the q-gram signature of a token to include the token itself, say, as the $0^{th}$ coordinate in the signature. The extension modifies the similarity function $fms^{apx}$ resulting in $fms^{t-apx}$. Under the broad assumption that all tokens in an input tuple are equally likely to be erroneous, the new approximation $fms^{t-apx}$ resulting from the modification of the token signature is expected to be a rank-preserving transformation of $fms^{apx}$. That is, if $v_1$ and $v_2$ are two reference tuples, and u an input tuple then $E[fms^{apx}(u, v_1)] > E[fms^{apx}(u, v_2)]$ implies $E[fms^{t-apx}(u, v_1)] > E[fms^{t-apx}(u, v_2)]$. Consequently, the fuzzy matches identified by using $fms^{t-apx}$ are the same as that identified by using $fms^{apx}$. Efficiency is gained without losing accuracy. The following Lemma formally states this result.

Definition of $fms^{t-apx}$: Let u be an input tuple, v be a reference tuple, t and r be tokens, q and H be positive integers. Define $$sim'_{mh}(t, r) = \frac{1}{2}\left(I[t = r] + \frac{1}{H}\sum_i I[mh_i(t) = mh_i(r)]\right)$$

$$fms^{t-apx}(u, v) = \sum_{col} \sum_{t \in tok(u[col])} w(t) * \underset{r \in tok(v[col])}{\text{Max}} \left(\frac{2}{q}sim'_{mh}(t, r) + d\right)$$

Lemma 3: If the probability of error in an input token is a constant p (0<p<1), then $fms^{t-apx}$ is a rank-preserving transformation of $fms^{apx}$.

The construction of the ETI index relation has to be modified to write additional tuples of the form [token, 0, column, tid-list].

Column Weights

The system can be extended to assign varying importance to columns while matching tuples. Let $W_1, \ldots, W_n$ be the weights assigned respectively to columns $A_1, \ldots, A_n$ such that $W_1 + \ldots + W_n = 1$. A higher $W_i$ value exaggerates the contribution due to matches and differences between attribute values in the $i^{th}$ column to the overall similarity score. The only aspect that changes is that of weights assigned to tokens during the query processing algorithm. Now, a token t in the $i^{th}$ column gets a weight $w(t) \cdot W_i$ where $w(t)$ is the IDF weight and $W_i$ is the column weight. The fuzzy match similarity function, the ETI building algorithm, and the rest of the query processing algorithm remain unchanged.

Token Transposition Operation

The exemplary fuzzy match similarity function may also consider additional transformation operations while transforming an input tuple to a reference tuple. Consider one such operation: the token transposition operation which re-orders adjacent tokens. Token transposition: Let $u[r, a_1, \ldots, a_n]$ be an input tuple. The token transposition operation transforms a token pair $(t_1, t_2)$ consisting of two adjacent tokens in $tok(a_i)$ where $t_2$ follows $t_1$ into the pair $(t_2, t_1)$. The cost is a function (e.g., average, min, max, or constant) $g(w(t_1), w(t_2))$ of the weights of $t_1$ and $t_2$. Because the token transposition operation only transforms the ordering among tokens the resulting similarity is still less (probabilistically) than fms$^{apx}$. Therefore, all the analytical guarantees of the fuzzy matching algorithm are still valid when it includes the token transposition operation.

Although various alternate embodiments of the invention have been described with a degree of particularity, it is the intent that the invention include all modifications and alterations from the disclosed designs falling within the spirit or scope of the appended claims.

The invention claimed is:

1. A process for testing an evaluation data record having attribute fields containing data comprising:

providing a reference table having a number of reference records against which a evaluation data record is tested;

identifying reference table tokens contained within the reference records of the reference table and determining a count of tokens in the reference table classified according to attribute field; and assigning a similarity score to said evaluation data record in relation to a reference record within the reference table based on a combination of:

the number of common tokens of an evaluation field of the evaluation data record and a corresponding field within a reference record from the reference table;

the similarity of the tokens that are not the same in the evaluation field of the evaluation data record and the corresponding field of the reference record from the reference table; and a weight of the tokens of the evaluation data record that is based on a count of the tokens from a corresponding field contained within the reference table; and wherein once a likely reference record that matches the evaluation data record with a specified degree of certainty is found, further searching for records in the reference table is stopped.

2. The process of claim 1 wherein a look-up table based of contents of reference records in the reference table is prepared before evaluation of the evaluation data record and wherein the tokens of the evaluation data record are evaluated by comparing the contents of the look-up table with contents of the tokens of said evaluation data record to prepare a candidate set of reference records for which a similarity score is assigned.

3. The process of claim 2 additionally comprising a step of evaluating tokens in the reference table by:

breaking tokens in the reference table up into sets of substrings having a length q;

applying a function to the set of substrings for a token to provide a vector representative of a token; and building a lookup table for substrings found within the tokens that make up the reference table.

4. The process of claim 2 additionally comprising a step of evaluating tokens in the reference table by applying a function to the set of substrings for a token to provide a vector representative of a token; and further comprising preparing the look-up table for tokens that make up the reference table by creating an entry in the look-up table for a token including an attribute field for the token or a substring, an attribute field for a co-ordinate within a vector for said token or substring, an attribute field for a frequency of said token or substring, and a list of reference records where said token or said substring appears in the specified field and vector co-ordinate position.

5. The process of claim 3 wherein the process of building the lookup table creates an entry for each substring comprising: an attribute field for said substring, a co-ordinate within a vector for said substring, a frequency of said substring, and a list of reference records where said substring appears in the specified attribute field and vector co-ordinate position.

6. The process of claim 5 wherein the weights that are assigned to tokens of the evaluation record are distributed across candidate records from the reference table during a determination of a candidate set of records.

7. The process of claim 1 wherein a closest K reference records from the reference table are identified as possible matches with the input record.

8. The process of claim 1 wherein reference records having a similarity score greater than a threshold are identified as candidate records.

9. The process of claim 1 wherein the tokens in different attribute fields are assigned different weights in determining said score.

10. The process of claim 1 wherein assigning a score includes determining a cost in transposing the order of two tokens in determining a similarity between tokens of the input data record and records in the reference table.

11. The process of claim 10 wherein the determining of a cost in transposing tokens takes into account a weight of said tokens that are transposed.

12. A process for testing an evaluation data record having attribute fields containing data comprising:

providing a reference table having a number of reference records against which a evaluation data record is tested;

identifying reference table tokens contained within the reference records of the reference table and determining a count of tokens in the reference table classified according to attribute field;

assigning a similarity score to said evaluation data record in relation to a reference record within the reference table based on a combination of:

the number of common tokens of an evaluation field of the input data record and a corresponding field within a reference record from the reference table;

the similarity of the tokens that are not the same in the evaluation field of the input data record and the corresponding field of the reference record from the reference table; and a weight of the tokens of the evaluation data record that is based on a count of the tokens from a corresponding field contained within the reference table;

wherein a look-up table based on contents of reference records in the reference table is prepared before evaluation of the evaluation data record and wherein the tokens of the evaluation data record are evaluated by comparing the contents of the look-up table with contents of the tokens of said evaluation data record to prepare a candidate set of reference records for which a similarity score is assigned;

evaluating tokens in the reference table by:

breaking tokens in the reference table up into sets of substrings having a length q;

applying a function to the set of substrings for a token to provide a vector representative of a token; and building a lookup table for substrings found within the tokens that make up the reference table, wherein the process of building the lookup table creates an entry for each substring comprising: an attribute field for said substring, a co-ordinate within a vector for said substring, a frequency of said substring, and a list of reference records where said substring appears in the specified attribute field and vector co-ordinate position;

wherein a candidate record table is built and records listed in the lookup table are added to the candidate record table based on vector representations of the tokens of the input record; and wherein once a likely reference record that matches the evaluation data record with a specified degree of certainty is found, further searching for records in the reference table is stopped.

13. The process of claim 12 wherein a candidate record is added to the candidate record table only if a score assigned to the reference record can exceed a threshold based on an already evaluated substring.

14. A process for testing an evaluation data record having attribute fields containing data comprising:

providing a reference table having a number of reference records against which a evaluation data record is tested;

identifying reference table tokens contained within the reference records of the reference table and determining a count of tokens in the reference table classified according to attribute field;

assigning a similarity score to said evaluation data record in relation to a reference record within the reference table based on a combination of:

the number of common tokens of an evaluation field of the input data record and a corresponding field within a reference record from the reference table;

the similarity of the tokens that are not the same in the evaluation field of the input data record and the corresponding field of the reference record from the reference table; and a weight of the tokens of the evaluation data record that is based on a count of the tokens from a corresponding field contained within the reference table; and maintaining a token frequency cache in a high speed access memory for use in assigning weights to said tokens.

15. A system for evaluating an input data record having fields containing data comprising:

a database for storing a reference table having a number of records against which an input data record is evaluated;

a preprocessor component for evaluating records in the reference table to identify tokens and determining a count of tokens in the reference table classified according to record field; and a matching component for assigning a score to an input data record in relation to a reference record within the reference table based on a combination of:

i) the number of common tokens of an evaluation field of the input data record and a corresponding field within a reference record from the reference table;

ii) the similarity of the tokens that are not the same in the evaluation field of the input data record and the corresponding field of the reference record from the reference table; and iii) a weight of the tokens of the input data record that is based on a count of the tokens from the corresponding field contained within the reference table; and wherein once a likely reference record that matches the input data record with a specified degree of certainty is found, further searching for records in the reference table is stopped.

16. The system of claim 15 wherein the preprocessor component evaluates tokens in the reference table by:

breaking tokens in the reference table up into sets of substrings having a length q;

applying a hash function to the set of substrings for a token to provide a vector representative of a token; and building a lookup table for substrings found within the tokens that make up the reference table.

17. The system of claim 16 wherein the preprocessor creates an entry in the lookup table for each substring, an attribute field for said substring, a co-ordinate within a vector for said substring, and a list of reference records where said substring appears in the specified attribute field and vector co-ordinate position.

18. A process for evaluating an input data record having attribute fields containing data comprising:

providing a number of reference records organized into attribute fields against which an input data record is evaluated;

evaluating reference records to identify tokens from said attribute fields and then evaluating each token to build a vector of token substrings that represent the token;

building an index table wherein entries of the index table contains a token substring and a list of reference records that contain a token that maps to the token substring; and looking up reference records in the index table based on the contents of the input record and selecting a number of candidate records from the reference records in the index table for comparing to said input data record, wherein once a likely reference record that matches the input data record with a specified degree of certainty is found, further searching for reference records in the index table is stopped.

19. The process of claim 18 wherein a candidate record table is built and candidate records from the index table are added to a candidate record table based on an H dimensional vector of token substrings determined from tokens contained in the input record.

20. The process of claim 19 wherein tokens are parsed from the input data record and tokens contained in said input data record are assigned token weights based on occurrences of the tokens in the reference table and further wherein records added to the candidate record table are factored by an amount corresponding to the weights of tokens extracted from the input data record.

21. The process of claim 20 wherein weights are assigned to tokens based on the attribute field in which the tokens are contained in the reference table.

22. The process of claim 18 additionally comprising a step of assigning a similarity score to said input data record in relation to a candidate set of reference records based on:

a cost in converting tokens in the input data record to tokens in a corresponding field of a reference record wherein the cost is based on a weight of the tokens in the corresponding field of said reference record corresponding to a count of the tokens from the corresponding field contained within the reference records.

23. The process of claim 18 wherein the reference records are stored in a reference table and wherein a candidate record table is built and candidate records from the index table are added to a candidate record table based on token substrings contained in the input record and wherein tokens contained in said input data record are assigned token weights based on occurrences of the tokens in the reference table and further wherein records added to the candidate record table are factored by an amount corresponding to the weights of tokens contained in the input data record.

24. The process of claim 18 wherein a closest K reference records from the reference table are identified as possible matches with the input record.

25. The process of claim 18 wherein reference records having a similarity score greater than a threshold are identified as candidate records.

26. The process of claim 18 wherein the tokens in different attribute fields are assigned different weights in determining said score.

27. The process of claim 18 wherein the index table additionally comprises an attribute field for a token from which a substring is derived.

28. The process of claim 18 wherein the vector is an H dimensional vector of token substrings and the index table entries also contain an attribute field, a position within the H dimensional vector and a frequency of reference records that map to the token substring contained in an index table entry.

29. A process for evaluating an input data record having attribute fields containing data comprising:
   providing a number of reference records organized into attribute fields against which an input data record is evaluated;
   evaluating reference records to identify tokens from said attribute fields and then evaluating each token to build a vector of token substrings that represent the token;
   building an index table wherein entries of the index table contains a token substring and a list of reference records that contain a token that maps to the token substring;
   looking up reference records in the index table based on the contents of the input record and selecting a number of candidate records from the reference records in the index table for comparing to said input data record;
   wherein a candidate record table is built and candidate records from the index table are added to a candidate record table based on an H dimensional vector of token substrings determined from tokens contained in the input record;
   wherein a candidate record is added to the candidate record table only if a possible score assigned to the reference record in the reference table can exceed a threshold based on an already evaluated substring; and
   wherein once a likely reference record that matches the input data record with a specified degree of certainty is found, further searching for reference records in the index table is stopped.

30. A process for evaluating an input data record having attribute fields containing data comprising:
   providing a number of reference records organized into attribute fields against which an input data record is evaluated;
   evaluating reference records to identify tokens from said attribute fields and then evaluating each token to build a vector of token substrings that represent the token;
   building an index table wherein entries of the index table contains a token substring and a list of reference records that contain a token that maps to the token substring;
   looking up reference records in the index table based on the contents of the input record and selecting a number of candidate records from the reference records in the index table for comparing to said input data record;
   assigning a similarity score to said input data record in relation to a candidate set of reference records based on a combination of:
      the number of common tokens of an evaluation field of the input data record and a corresponding field within a reference record;
      the similarity of the tokens that are not the same in the evaluation field of the input data record and the corresponding field of the reference record; and
      a weight of the tokens in the evaluation field of the input data record based on a count of the tokens from the corresponding field contained within the reference records; and
   maintaining a token frequency cache in a high speed access memory for use in assigning weights to said tokens.

31. A system for evaluating an input data record having fields containing data comprising:
   a database for storing a reference table having a number of reference records against which an input data record is evaluated;
   a preprocessor component for evaluating reference records in the reference table to identify tokens and determining a count of tokens in the reference table classified according to record field; said preprocessor evaluating reference records to identify tokens from said attribute fields and then evaluating each token to build a H dimensional vector of token substrings that represent the token; and building an index table wherein entries of the index table contains a token substring, an attribute field, a position within the H dimensional vector, and a list of reference records; and
   a matching component for assigning a score to an input data record in relation to a reference record within the reference table by building a candidate record table of candidate records from the index table based on an H dimensional vector of token substrings determined from tokens contained in the input record and assigning a score to said candidate records based on a weight of the tokens of the input data record that is based on a count of the tokens from the corresponding field contained within the reference table; and
   wherein once a likely reference record that matches the input data record with a specified degree of certainty is found, further searching for reference records in the reference table is stopped.

32. A data structure encoded on a computer readable medium for use in evaluating an input data record having fields containing data comprising:
   a reference table organized in attribute columns having a number of records against which an input data record is evaluated; and
   an index table wherein each entry of the index table contains a token substring from a token in the reference table, a column of the reference table having said token from which the token substring is derived, a position within a H dimensional vector based on said token, and a list of records contained within the reference table,
   wherein once a likely record in the reference table matches the input data record with a specified degree of certainty is found, further searching for reference records in the reference table is stopped.

33. The data structure of claim 32 wherein each entry of the index table additionally comprises an attribute field for the token from which a substring is derived.

34. A machine readable medium including instructions for evaluating an input data record having attribute fields containing data by steps of:
   accessing a reference table having a number of records organized into attribute fields against which an input data record is evaluated;
   evaluating records in the reference table to identify tokens from said attribute fields and then evaluating each token with a function to build a vector of token substrings that serve as a signature of the token;

building an index table wherein each entry of the index table contains a token substring, a column of the reference table, a position within the vector, and a list of records contained within the reference table; and looking up records in the index table based on the contents of the input record, wherein once a likely reference record that matches the input data record with a specified degree of certainty is found, further searching for records in the reference table is stopped.

35. The machine readable medium of claim 34 wherein a candidate record table is built and records from the index table are added to a candidate record table based on vector substring representations of the tokens of the input record.

36. The machine readable medium of claim 35 wherein a candidate record is added to the candidate record table only if a score assigned to the reference record can exceed a threshold based on an already evaluated substring representation of the input record.

37. The machine readable medium of claim 34 wherein a closest K reference records from the reference table are identified as possible matches with the input record.

38. The machine readable medium of claim 34 wherein reference records having a similarity score greater than a threshold are identified as candidate records.

39. The machine readable medium of claim 34 wherein the tokens in different attribute fields are assigned different weights in determining said score.

40. The machine readable medium of claim 34 wherein the index table additionally comprises an attribute field for a token from which a substring is derived.

41. A machine readable medium including instructions for evaluating an input data record having attribute fields containing data by steps of:

accessing a reference table having a number of records organized into attribute fields against which an input data record is evaluated;

evaluating records in the reference table to identify tokens from said attribute fields and then evaluating each token with a function to build a vector of token substrings that serve as a signature of the token;

building an index table wherein each entry of the index table contains a token substring, a column of the reference table, a position within the vector, and a list of records contained within the reference table;

looking up records in the index table based on the contents of the input record;

wherein a candidate record table is built and records from the index table are added to a candidate record table based on vector substring representations of the tokens of the input record; and wherein once a likely reference record that matches the input data record with a specified degree of certainty is found, further searching for records in the reference table is stopped.

42. A machine readable medium including instructions for evaluating an input data record having attribute fields containing data by steps of:

accessing a reference table having a number of records organized into attribute fields against which an input data record is evaluated;

evaluating records in the reference table to identify tokens from said attribute fields and then evaluating each token with a function to build a vector of token substrings that serve as a signature of the token;

building an index table wherein each entry of the index table contains a token substring, a column of the reference table, a position within the vector, and a list of records contained within the reference table;

looking up records in the index table based on the contents of the input record;

assigning a similarity score to said input data record in relation to a candidate set of reference records within the reference table based on a combination of:

the number of common tokens of an evaluation field of the input data record and a corresponding field within a reference record from the reference table;

the similarity of the tokens that are not the same in the evaluation field of the input data record and the corresponding field of the reference record from the reference table; and a weight of the tokens in the evaluation field of the input data record that is based on a count of the tokens from the corresponding field contained within the reference table; and maintaining a token frequency cache in a high speed access memory for use in assigning weights to said tokens.

* * * * *